Sept. 12, 1950 G. E. JODELL 2,522,374
HEAT TRANSFER SYSTEM EMPLOYING NONCONDENSIBLE GAS
Filed Aug. 8, 1945 2 Sheets—Sheet 1

INVENTOR.
Georg Elis Jodell
BY
D. E. Heath
his ATTORNEY

Patented Sept. 12, 1950

2,522,374

UNITED STATES PATENT OFFICE 2,522,374

HEAT TRANSFER SYSTEM EMPLOYING NONCONDENSABLE GAS

Georg Elis Jodell, Prahran, Victoria, Australia, assignor, by mesne assignments, to Aktiebolaget Elektrolux, a corporation of Sweden Application August 8, 1945, Serial No. 609,637
In Australia November 9, 1944

8 Claims. (Cl. 237—1)

My invention relates to heat transfer systems, and more particularly to such a system employing an inert or non-condensable gas.

It is an object of the invention to employ such a heat transfer system containing a volatile heat transfer agent and a non-condensable gas to take up heat from apparatus of the type where heat desirably is removed so that the temperature thereof does not exceed a definite maximum value, and to utilize such excess heat at a place of use.

More particularly, it is an object to provide such a heat transfer system employing inert gas to transfer heat from heat rejecting parts of apparatus, such as a refrigerator, for example, to water heating apparatus to effect heating of the latter.

I attain above and other objects by the means illustrated in the accompanying drawing, in which—

Figure 1:
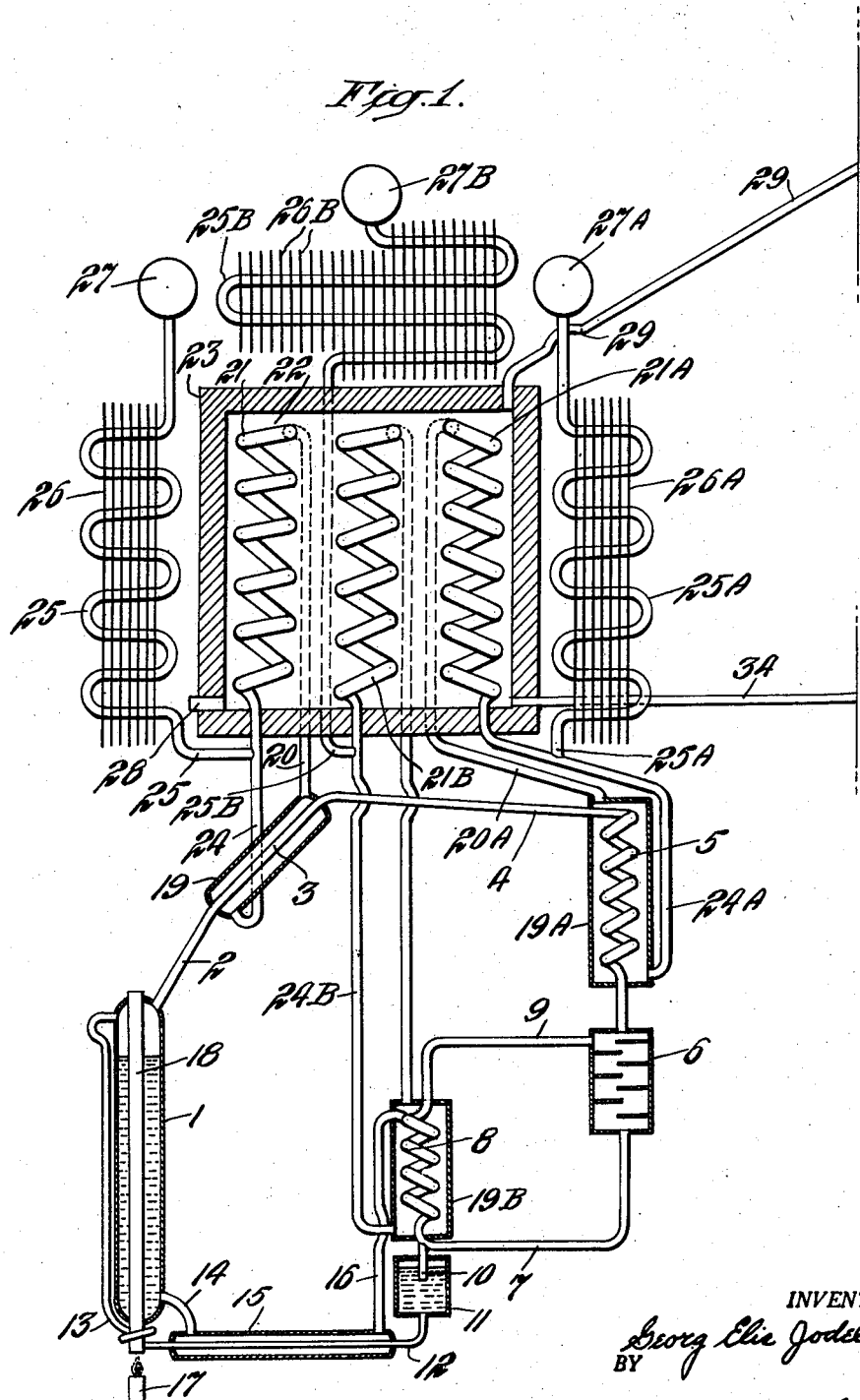
Figure 1A:
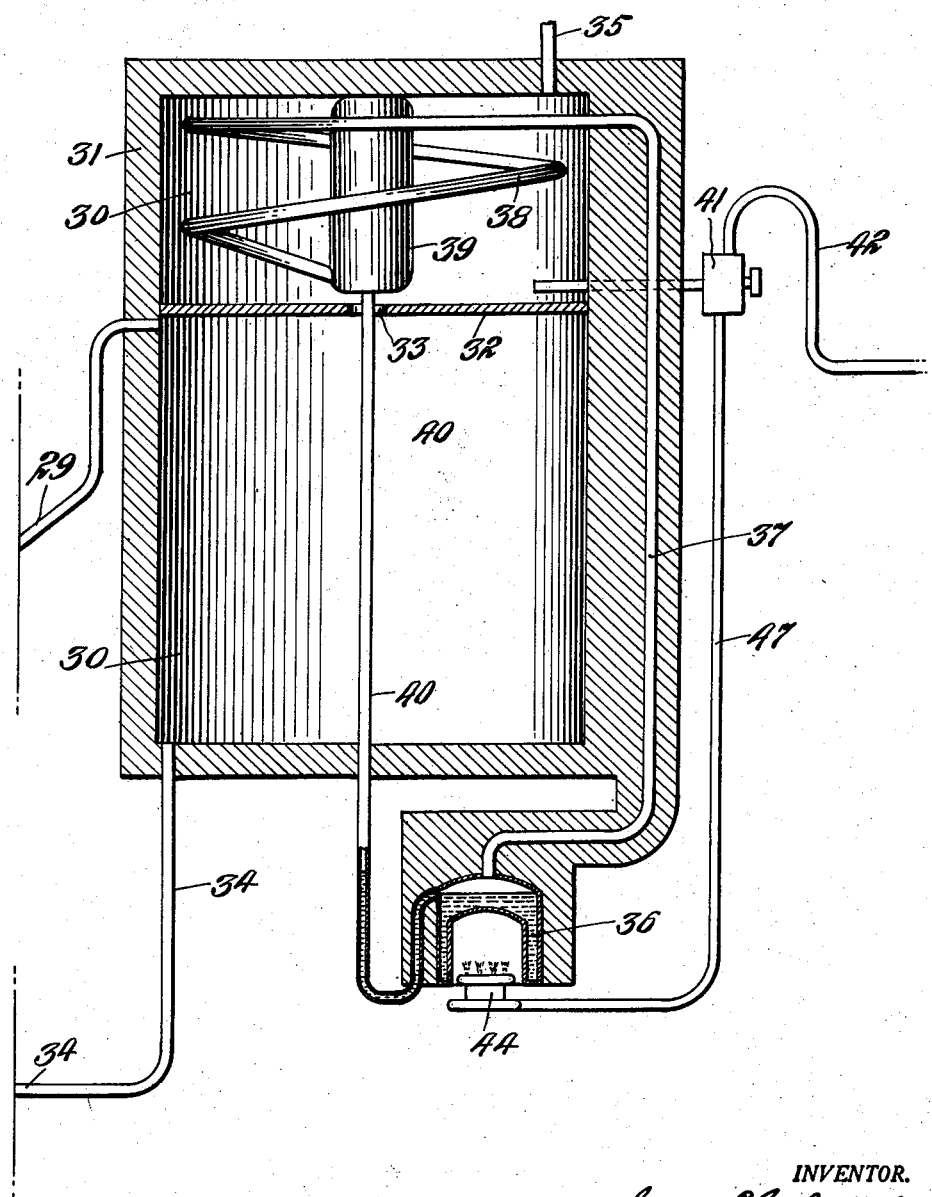

Figure 1 shows diagrammatically one suitable arrangement according to this invention, and Figure 1A, which is an extension of Figure 1, shows diagrammatically a preferred additional arrangement.

Means hereinafter described includes a closed evaporating-condensing heat-transfer system.

The use of such a system has been proposed for transferring heat from a heat source to an absorption refrigerating apparatus or other apparatus of equally high operating temperature, the system containing mercury or other vaporising medium and an inert gas (normally at sub-atmospheric pressure). In that case the transfer of heat is controlled according to variations in the temperature of the heat source: thus, if the temperature of the heat source is too high the vapour in the system is not condensed at the normal heat-receiving point but passes on beyond the refrigerating apparatus or said other apparatus to a place where it gives up heat to a reflux condenser. Consequently, the refrigerating apparatus or said other apparatus is not over-heated. In this way the transfer of heat to the refrigerating apparatus or said other apparatus is maintained within the desired limits of normal operating temperature.

The inventor of the present means of utilizing waste heat recently devised an improvement for heating liquid with the aid of a closed evaporating-condensing system, forming the subject of copending United States patent application Serial No. 590,206, filed April 25, 1945, for heating water in a storage tank, in which water or other liquid is employed as the vaporising medium and an inert gas is also employed at a predetermined, preferably sub-atmospheric pressure in the closed system. By "inert gas" is meant nitrogen, hydrogen or other gas which is not condensible under the conditions of use and which is indifferent to the vaporising medium and will not cause serious corrosion of the coil or other structural parts. That system contains a boiler and a coil or similar passageway which passes down the tank in direct contact with the water, and it operates in such a way that the delivery of heat is controlled not by the temperature at the heat source but by the temperature of the water in the tank. That control has special characteristics as hereunder explained. In that system the vapour presses back the inert gas from the commencement of the coil and there condenses until the surrounding water in that zone of the tank has been heated up to the temperature of the vapour. The vapour then ceases to condense, the inert gas is pressed further down the coil, and the next zone of water is heated by the condensation of the vapour in the corresponding part of the coil, and so on. The coil leads into an air-cooled gas reservoir into which the inert gas is finally compressed. The gas reservoir and coil are connected to the vaporising portion of the system by a return pipe for the liquid condensate. The water in the tank is thus heated progressively downwards but is prevented from rising more than a few degrees above the initial temperature of the vapour because the condensation in the coil only takes place when the vapour reaches a portion of the coil where the temperature of the surrounding water is below the condensation temperature of the vapour.

In the present invention the above-mentioned controlled system of heating water in a storage tank is adapted to the utilization of the heat available at the heat-dissipation points of a refrigerator or other apparatus of the type hereinbefore specified.

As this invention is more especially intended for use in connection with absorption refrigerators it is described more specifically in relation to that type of apparatus.

In Figure 1 is shown diagrammatically an absorption type refrigerator unit in which the boiler 1 is connected by the vapour pipe 2 to the water separator 3. A pipe 4 connects the water separator 3 with a condenser 5, leading into the evaporator 6. From the evaporator a pipe 7 leads into the bottom of the absorber coil 8 and a return pipe 9 leads back from the absorber to the evaporator. A tube 10 carries the strong ammonia solution to the lower absorber vessel 11 and from this vessel the strong ammonia solution returns through a pipe 12 by way of a pump tube 13 back to the boiler. A tube 14 leads the weak solution from the bottom of the boiler to a tube 15, which is in heat exchanging position with the tube 12, and the weak solution passes on through the tube 15 and back through a tube 16 to the top of the absorber coil 8.

The heat supply to the boiler is represented by a gas burner 17. Combustion gases from the gas burner pass through the central tube 18 of the boiler, thereby giving off heat to the boiler. A jacket 19 is provided surrounding the water separator 3. From the highest point of this jacket a tube 20 leads to the top of a coil 21 or other condenser located in a water tank 22 provided with insulation 23. This insulated tank is placed above the refrigerator unit. A tube 24 connects the bottom of the coil 21 with the lowest point of the jacket 19. From the tube 24, at a point located above the jacket 19 but below the lowest point of coil 21, is connected an air-cooled condenser 25 provided with fins 26. At the far end of the condenser 25 is located a gas reservoir 27, unless the condenser 25 is large enough to act itself as a gas reservoir. The jacket, coil, condenser 25, gas reservoir, and their connecting pipes form a complete sealed system filled with a vaporising medium (such as water, for example) and inert gas. The system is otherwise completely evacuated.

The inert gas is at a predetermined and preferably sub-atmospheric pressure. The resultant vapour presses back the inert gas in the coil 21 or other condenser (hereinafter in the description included generically in the term "coil"), so that the vapour thus passes into the first portion of the coil where it gives up heat to the surrounding water and condenses. The condensate flows down the coil and returns to said jacket and the water surrounding this first portion of the coil ultimately becoming heated to or approximately to a predetermined temperature at which time the vapour does not condense but passes on to the next portion of the coil, and so on, thus heating the tank progressively and substantially uniformly from the top to the tank downwards. Inert gas expelled from the bottom of the coil passes through the air-cooled condenser 25 into the gas reservoir 27 and vapour which ultimately passes into the air-cooled condenser is condensed therein, so that heat is removed from the said heat-dissipating part 3 continuously and uniformly even when all of the water in the tank 22 has been heated up to the predetermined temperature.

In order that this invention in its application to an absorption refrigerator may be more clearly understood, the heat-balance of an absorption refrigerator will now be explained.

In an absorption type refrigerator, heat is applied to the boiler by means of gas, electricity or kerosene. Heat is also applied to the unit through the evaporator inside the cabinet. Although this heat is applied at a very low temperature, for instance minus 15° C., it is nevertheless to be considered as a heat supply to the refrigerating apparatus.

In the course of its operation, all of the heat that is applied to the refrigerator unit must, of necessity, also be removed from the unit. The sources of removal of heat from the absorption type refrigerator unit are:
1. The water separator.
2. The condenser.
3. The absorber.
4. Radiation losses through the insulation of the boiler and the liquid heat exchanger.

As an example is given the following approximate heat balance on a refrigerator unit operating a 4 to 5 cubic feet cabinet:

| Heat supplied to— | Heat carried off from— |
|---|---|
| Boiler_____236 Cal. per hour<br>Evaporator__ 42 Cal. per hour<br><br>278 Cal. per hour | Water Separator____88 Cal. per hour<br>Condenser_____58 Cal. per hour<br>Absorber_____78 Cal. per hour<br>Insulation losses____54 Cal. per hour<br><br>278 Cal. per hour |

In the construction of absorption type refrigerators one of the main problems is to bring down the heat supply to the boiler without decreasing the heat supply to the evaporator. In other words, to achieve the same amount of refrigeration (heat supplied to the evaporator) with a smaller amount of heat supplied to the boiler.

It is obvious that if the heat carried off from the refrigerator unit can be usefully employed, this will mean in effect the same as a lowering of the heat supplied to the boiler; in other words, the running cost of the refrigerator will be considerably reduced.

The question of being able to use the heat carried off from the refrigerator unit is closely linked up with the temperature level of this heat; therefore the following figures are given:

1. The temperature of the water separator varies from 150° C. at the starting point, i. e. approximately the temperature at which the vapour leaves the boiler, to 59° C. which is the temperature at the end of the water separator.

2. The temperature of the condenser is approximately 55° C.

3. The temperature of the absorber is approximately 54° C.

As will be seen, the level of the heat in all these three parts of the unit is high enough to be useful for a hot water service and several constructions have been developed in order to utilise this heat for the purpose mentioned. Difficulties have been encountered, however, in the known constructions in that, when the heated water is not regularly withdrawn, overheating of this water and consequently overheating of the heat-dissipating parts of the refrigerator unit takes place. To overcome this difficulty, constructions have been made with elaborate valves in the water containers which automatically come into operation and spill a certain amount of hot water when the temperature reaches the danger level. It is obvious that these sensitive valves are apt to cause trouble and it is also clear that should the water supply be switched off the refrigerator unit will cease to function. That would not be the case when using the construction according to the present invention, as the air-cooled condenser 25 will remove from the vapour of the vaporising medium the heat absorbed from the water separator and also, as hereinafter described, from other heat-dissipating parts of a refrigerator.

A second closed evaporating-condensing system is provided by a jacket 19A around the condenser 5 together with associated parts 20A, 21A, 24A, 25A, 26A, and 27A, while a third closed evaporating-condensing system is provided by a jacket 19B around the absorber 8 together with associated parts 20B, 21B, 24B, 25B, 26B, and 27B. The coils 21A and 21B are positioned in the tank 22 which contains the coil 21. The second and third systems operate in the same manner as the system that is above-described in relation to the water separator, each of the parts designated by a numeral with the suffix A or the suffix B functioning in exactly the same way as the part designated by the same numeral without the suffix. The tank 22 has a cold water inlet 28 at the bottom and a hot water outlet 29 at the top.

The dimensions of the coils 21, 21A and 21B depend upon the heat received from the respective heat-dissipating parts 3, 5 and 8.

The finned condensers 25, 25A and 25B are placed so that a free flow of condensate back to the jackets can take place.

These closed evaporating-condensing systems are fitted and operate as described in the specification of United States patent application Serial No. 590,206, hereinbefore mentioned.

The arrangement according to this invention has the advantages that it does not cease to cool the heat-dissipation parts of the refrigerator if hot water is not withdrawn from the tank 22 or if the water supply is cut off, because the cooling is then effected by condensation of the vapour in the condensers outside the water tank.

Although the water in the tank 22 could be heated up to the vicinity of 50° to 55° C., it is obvious that the lower the temperature is kept in the tank 22 the more efficient will be the working of the refrigerator unit. In other words, if the filling pressures in the three respective systems are selected so that the water in tank 22 is only heated up to 40° C., for example, the refrigerator unit will function with greater efficiency than would be the case if the water in the tank was allowed to rise higher. Certain freedom of choice of filling pressures is, however, allowable in the individual three systems. It may, for instance, be of advantage to select the filling pressure in the system that covers the water separator so that a higher boiling point is achieved at this part compared with those at the condenser and the absorber. This may necessitate a dissection of the water tank into two tanks or a partitioning off of the water surrounding the condenser coils 21 from the water surrounding the condenser coils 21A and 21B. In such a case the water surrounding coil 21 should be the first water that leaves the tank 22 when tapping takes place so that this hotter water, during its passage out, does not make contact with the coils 21A and 21B.

It is obvious that quite a number of arrangements in regard to the placing of the coils in the water tank 22 can be made, and it is also clear that it is not necessary to have only one tank—each system can have its own tank. It is further quite feasible that the jackets 19A and 19B could be combined into one jacket and consequently the condenser coils 21A and 21B could be combined into one condenser. In other words, these two closed evaporating-condensing systems could be made one system. It would be possible, although probably not desirable, to combine all three systems into one.

It is desirable to make the tank 22 comparatively small (as, for example, of about 5 gallons capacity) in order to avoid making the combined refrigerator and hot water system too bulky, and it is obvious that if this tank of 5 gallons capacity were relied upon as a hot water system, the amount of hot water that could be withdrawn when the tank was up to full temperature would be only 5 gallons, which amount would be too small, for instance, for a bath. It is also clear that when these 5 gallons were withdrawn it would take the refrigerator unit a considerable time before it was again ready to deliver another 5 gallons of hot water.

On the other hand, if the water in the tank is only heated up to a level of 40° C. this water is not directly "useful" as a hot water service, but nevertheless it will save a considerable amount of heat for a hot water system located in the vicinity of the apparatus because this water at 40° C. can be fed into this latter hot water system, and instead of the hot water system having to heat water from the normal incoming temperature up to, say, 60° C. it now only has to heat it up from 40° C. to 60° C.

The ideal condition is that the finned condensers 25, 25A and 25B should operate as little as possible, and it is obvious that when tank 22 is only a supply tank to the outside hot water system then, particularly at night-time, these finned condensers would be working most of the time because no hot water is being withdrawn from the outside hot water system. In order to overcome this disadvantage an arrangement of the outside hot water system is shown diagrammatically, mainly in Figure 1A, which enables the refrigerator unit to put heat into the tank 22 for a much longer period than would be the case if the tank 22 was only a supply tank. In this latter arrangement:

A tank 30, provided with insulation 31, is placed outside the combined refrigerator and hot water system. It is divided at approximately two-fifths from the top into two sections by a partition 32 which has a centre hole 33. The warm water outlet pipe 29 from the tank 22 supplies water to the top of the lower section of the tank 30. 34 is a pipe connecting the bottom of the tank 22 with the bottom of the lower section of the tank 30. 35 is the hot water outlet from the top section of the tank 30. 36 is a boiler, from the top of which leads a steam pipe 37 to the top of a coil 38 located in the top section of the tank 30. The tail end of the coil 38 is connected to a pressure vessel 39. From the bottom of this pressure-vessel, below the inlet point of the coil 38 into said vessel, is connected a condensate pipe 40 which runs back to the boiler 36. 41 is a gas thermostat, the bulb of which is located near the bottom of the upper portion of the tank 30. 42 is a gas inlet pipe to the thermostat. 47 is a gas tube from the thermostat to a gas burner 44 which operates the boiler 36.

As will be seen, the parts 36, 37, 38, 39 and 40 form a closed evaporating-condensing system operated by the gas burner 44. The thermostat is set so that the gas is cut off from the burner when a suitable temperature is reached in the upper section of the tank 30, say for instance 60° C.

The upper section of the tank 30 with its closed evaporating-condensing system, forms a hot water system of its own and we shall assume that the volume of the upper section of tank 30 is 10 gallons. At the same time we may assume that the lower section of tank 30 has a volume of, say, 15 gallons.

It will now be clear that the tank 22 acts as a circulating heating unit for the lower section of the tank 30. If the whole combined system is started from cold, it will be understood that when hot water is created in the top portion of the tank 22 this hot water will circulate upwards through the pipe 29 to the top of the lower section of the tank 30, and cold water from the bottom of the tank 30 will at the same time circulate through a pipe 34 into the bottom of the tank 22. In this way the refrigerator unit will be able to expel heat up to a temperature of, say, 40° C. not only to the 5-gallon tank 22 but also to the 15-gallon capacity section of the tank 30, and therefore the refrigerator unit can operate as a water-cooled unit without the air-cooled condensers 25, 25A and 25B coming into action for a very long time.

The top section of the tank 30 is selected to have a volume of, say, 10 gallons. This means that 10 gallons of hot water (60° C.) can be withdrawn through the outlet pipe 35 and replaced by 10 gallons of water from the lower portion of the tank 30 which may have a temperature of 40° C. The boiler 36 and coil 38 will now only have to raise the temperature of this new water from 40° to 60°, and if a suitable heat input is selected for the gas burner 44, this should be possible to achieve in a comparatively short time, say, a quarter of an hour. The fact that the outside hot water system is dissected into two portions as described consequently does not affect the efficiency of the outside hot water tank as a whole, and the refrigerator unit is able to run for a long period without necessitating the use of the outside air-cooled condensers.

With the volumes and temperatures assumed in this description, and assuming that the consumption of hot water is 30 gallons per day, the refrigerator unit will be able to apply practically all of its heat to the water in the tank 22 and in the lower section of the tank 30 and the air-cooled condensers will not operate; furthermore, it is obvious that this will be the case independently of the fact that no hot water is normally drawn through the pipe 35 during the night.

It is not necessary to have a separate unit operating the top portion in the tank 30. It would be quite feasible to cut out this top portion and its operating unit and to rely entirely on the lower portion of the outside unit. This lower portion would then form a hot water system which is being heated by means of a circulating unit consisting of the tank 22 with its operating mechanism, including the refrigerator unit. In other words, the outside tank could then be said to be the tank embodied in a slow recovery hot water system. In such a construction it would probably be advisable to operate the tank 22 above 40° C.

If the outside hot water system is made on the lines shown in the drawing, the top section could be heated by any other suitable means or according to any of the known ways of heating hot water tanks.

If the refrigerator unit should become faulty the unit and tank 22 with its condensers can be removed from the refrigerator and the outside hot water tank will still operate in such a way that the pipe 34 will be the direct inlet pipe for cold water and 35 the outlet pipe for hot water. The pipe 29 will simply be closed by a stopcock.

I claim:

1. The method of transferring heat which comprises evaporating volatile fluid at a place of vaporization associated with a source of heat, flowing vapor from the place of vaporization to a first place of heat rejection in thermal exchange relation with a place of heating and from which first place such vapor displaces inert gas in an unobstructed path of flow to a second place of heat rejection, condensing the vapor at the first place of heat rejection to transfer heat to the place of heating and flowing condensate therefrom to the place of vaporization, flowing vapor from the first place of heat rejection through the unobstructed path of flow to the second place of heat rejection to displace inert gas therein when the place of heating reaches a definite average maximum temperature, condensing such last-mentioned vapor at the second place of heat rejection to transfer heat to a medium which is in thermal exchange relation therewith and at a lower temperature than the place of heating, and flowing such last-mentioned condensate from the second place of heat rejection to the place of vaporization in a path of flow having at least a portion thereof in common with the unobstructed path of flow for vapor leading from the first to the second place of heat rejection and through which portion condensate and vapor flowing from the first place to the second place of heat rejection can always freely pass each other.

2. The method of transferring heat to a medium at a place of heating which comprises evaporating volatile fluid at a place of vaporization associated with a source of heat, flowing vapor upwardly from the place of vaporization to a first place of heat rejection in thermal exchange relation with the place of heating and from which first place such vapor displaces inert gas in an unobstructed path of flow to a second place of heat rejection, condensing the vapor at the first place of heat rejection to transfer heat to the medium at the place of heating and flowing condensate downwardly therefrom by gravity to the place of vaporization, flowing vapor from the first place of heat rejection through the unobstructed path of flow to the second place of heat rejection to displace inert gas therein when the medium at the place of heating reaches a definite average maximum temperature, condensing such last-mentioned vapor at the second place of heat rejection to transfer heat to a medium which is in thermal exchange relation therewith and at a lower temperature than the medium at the place of heating, and flowing such last-mentioned condensate by gravity from the second place of heat rejection to the place of vaporization in a path of flow having at least a portion thereof in common with the unobstructed path of flow for vapor leading from the first to the second place of heat rejection and through which portion condensate and vapor flowing from the first place to the second place of heat rejection can always freely pass each other.

3. The method of transferring heat from a heat dissipating part of apparatus, such as refrigeration apparatus, for example, so as to maintain such part at a temperature which will not exceed a definite value, said method comprising the steps of evaporating volatile fluid at a place of vaporization in thermal exchange relation with the heat dissipating part, flowing vapor from the place of vaporization in a path of flow including a downwardly directed portion which is in thermal exchange relation and out of physical contact with a body of liquid and from which downwardly directed portion such vapor displaces inert gas to another place of heat rejection, condensing the vapor in the downwardly directed portion to transfer heat to the liquid body and flowing condensate therefrom to the place of vaporization, flowing vapor from the downwardly directed portion to the other place of heat rejection to displace inert gas therein when the liquid body reaches substantially a definite average maximum temperature, condensing such last-mentioned vapor at the other place of heat rejection to transfer heat to a medium which is in thermal exchange relation therewith and at a lower temperature than the liquid body, and, regardless of the pressure of the vapor in said first and second places of heat rejection when condensation is effected in said second place, always flowing by gravity any condensate present in said second place of heat rejection in a path of flow leading therefrom to the place of vaporization.

4. The method of transferring heat from a heat dissipating part of apparatus, such as refrigeration apparatus, for example, so as to maintain such part at a temperature which will not exceed a definite value, said method comprising the steps of evaporating volatile fluid at a place of vaporization in thermal exchange relation with the heat dissipating part, flowing vapor from the place of vaporization in a path of flow including a downwardly directed portion which is in thermal exchange relation and out of physical contact with a body of liquid through a vertical height extending downwardly from a region adjacent a first level at which liquid is withdrawn toward a second lower level at which liquid is introduced thereto and from which downwardly directed portion such vapor displaces inert gas through an unobstructed path of flow to another place of heat rejection, condensing the vapor in the downwardly directed portion to transfer heat to the liquid body and flowing condensate therefrom by gravity to the place of vaporization, flowing vapor from the downwardly directed portion through the unobstructed path of flow to the other place of heat rejection to displace inert gas therein upon definite increase in vapor pressure in the downward path, condensing such last-mentioned vapor at the other place of heat rejection to transfer heat to a medium which is in thermal exchange relation therewith and at a lower temperature than the liquid body, and flowing such last-mentioned condensate by gravity to the place of vaporization in a path of flow having at least a portion thereof in common with the unobstructed path of flow for vapor and through which portion vapor and condensate can always freely pass each other.

5. Apparatus, such as a refrigeration system, for example, having at least one heat dissipating part whose temperature should not exceed a definite value, a vessel removed from such part for holding a body of liquid, a heat transfer circuit containing a vaporizable fluid and an inert gas and including a vaporizing element in thermal exchange relation with said heat dissipating part, a vertically extending condensing element disposed in said vessel which is connected to receive vaporized fluid at the upper end thereof from said vaporizing element and in which such fluid condenses to transfer heat to liquid held in said vessel, a member for collecting inert gas connected to the lower end of said condensing element and into which vaporized fluid passes upon a definite increase in vapor pressure in said circuit, said member being out of thermal contact with said vessel and liquid therein and the vaporized fluid passing into said member condensing therein to transfer heat to a medium in thermal relation therewith, and conduit means for conducting condensate by gravity from said condensing element and said member to said vaporizing element, said conduit means being so formed and arranged that condensate can always freely flow from said member irrespective of the vapor pressure in said circuit.

6. Apparatus as set forth in claim 5 in which said vessel is provided with an inlet for liquid at one level and an outlet for liquid at a higher level, and said condensing element is disposed in said vessel and extends vertically downward from a vicinity adjacent the higher level.

7. Apparatus as set forth in claim 5 including a second vessel for liquid, conduit means connecting said vessels for circulation of liquid therebetween, said vessel having said condensing element disposed therein being provided with an inlet for liquid, said second vessel having an outlet for withdrawing liquid therefrom, and heating means for further raising the temperature of liquid in said second vessel before being withdrawn therefrom through the outlet.

8. Apparatus as set forth in claim 5 including a second vessel for liquid and partition means therein to form upper and lower compartments having a restricted liquid passage therebetween, upwardly extending conduit means connecting the upper part of said vessel in which said condensing element is disposed and the upper part of the lower compartment in said second vessel, downwardly extending conduit means connecting the bottom part of the lower compartment and the bottom part of said vessel in which said condensing element is disposed, the last-mentioned vessel having an inlet for liquid at the bottom part thereof, and means for heating liquid in the upper compartment of said second vessel, said second vessel having an outlet for withdrawing liquid from the upper part of the upper compartment.

GEORG ELIS JODELL.

REFERENCES CITED

The following references are of record in the file of this patent:

UNITED STATES PATENTS

| Number | Name | Date |
|---|---|---|
| 1,206,789 | Adams | Dec. 5, 1916 |
| 2,028,261 | Vernet | Jan. 21, 1936 |
| 2,131,635 | Mullen | Sept. 27, 1938 |

FOREIGN PATENTS

| Number | Country | Date |
|---|---|---|
| 473,152 | Germany | May 7, 1931 |